United States Patent [19]

Intichar et al.

[11] 4,386,289
[45] May 31, 1983

[54] DEVICE FOR COOLING A SUPERCONDUCTING FIELD WINDING AND A DAMPER SHIELD OF THE ROTOR OF AN ELECTRIC MACHINE

[75] Inventors: Lutz Intichar; Christoph Schnapper, both of Erlangen; Erich Weghaupt, Mulheim am Rhein, all of Fed. Rep. of Germany

[73] Assignee: Siemens Aktiengesellschaft, Berlin and Munich, Fed. Rep. of Germany

[21] Appl. No.: 268,917

[22] Filed: Jun. 1, 1981

[30] Foreign Application Priority Data

Jun. 2, 1980 [DE] Fed. Rep. of Germany ....... 3020831

[51] Int. Cl.³ ............................................. H02K 9/00
[52] U.S. Cl. ....................................... 310/52; 310/61; 310/64; 310/261
[58] Field of Search ...................... 310/64, 61, 10, 40, 310/52, 53, 261

[56] References Cited

U.S. PATENT DOCUMENTS

| 4,085,343 | 4/1978 | Hasegawa et al. | 310/52 |
| 4,152,609 | 5/1979 | Cooper et al. | 310/261 |
| 4,204,134 | 5/1980 | Fritz et al. | 310/61 |
| 4,228,374 | 10/1980 | Elsel | 310/64 |
| 4,267,474 | 5/1981 | Kullmann | 310/261 |
| 4,297,603 | 10/1981 | Weghaupt | 310/64 |
| 4,315,172 | 2/1982 | Intichar et al. | 310/64 |

FOREIGN PATENT DOCUMENTS 2439719 8/1974 Fed. Rep. of Germany ........ 310/52

OTHER PUBLICATIONS

A. Bejan; Cryogenic Cooling System for Superconducting Syncr. Generator; M.I.T. PHD-Thesis; Publ. 12/74.
K. D. Timmerhaus & H. A. Snyder; Advances in Cryogenic Engineering; vol. 25; Plenum Press; New York & London.
J. H. Parker, Jr. & R. A. Towne; Superconducting Generator Design EL-577; Westinghouse Electr. Corp.; E. P. R. Institute; Palo Alto, CA.
Helium Cooling System; Siemens Forsch. U. Entwickl. Ber. BD. 5; 1976; No. 1; p. 13.

Primary Examiner—R. Skudy
Attorney, Agent, or Firm—Kenyon & Kenyon

[57] ABSTRACT

A cooling device for a superconducting field winding of an electric machine, especially a turbo-generator, contains an exhaust gas line connected to a coolant space for cooling an end piece at the end face of a torque transmitting rotor body part as well as a coolant line extending along a damper shield arranged around the field winding. In order to utilize the liquid coolant in a particularly economical and simple manner, the coolant line of the damper shield is a section of the coolant exhaust gas line, and this section is arranged, as seen in the flow direction of the coolant exhaust gas, ahead of the line section of the torque transmitting end piece.

5 Claims, 2 Drawing Figures

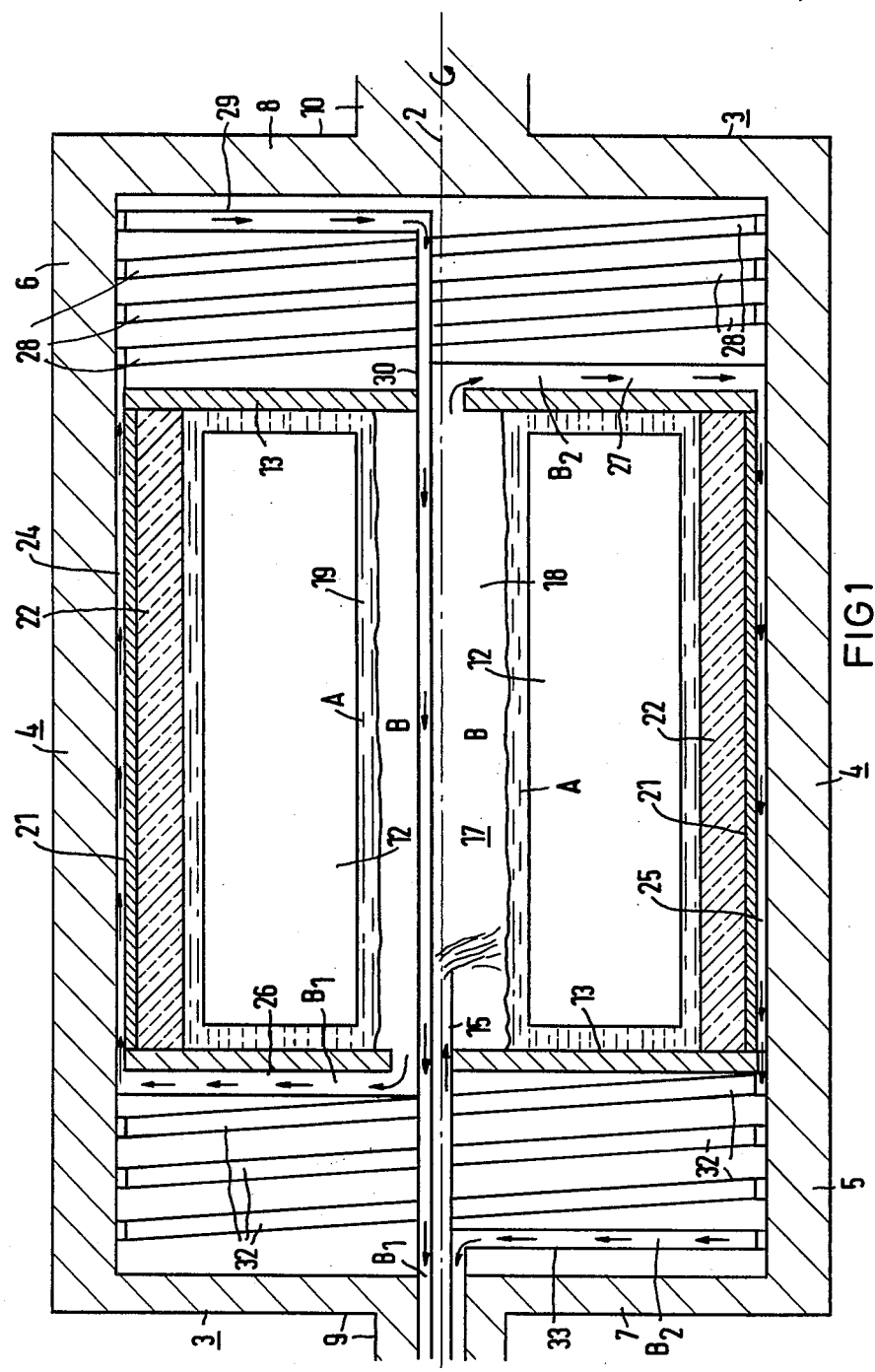

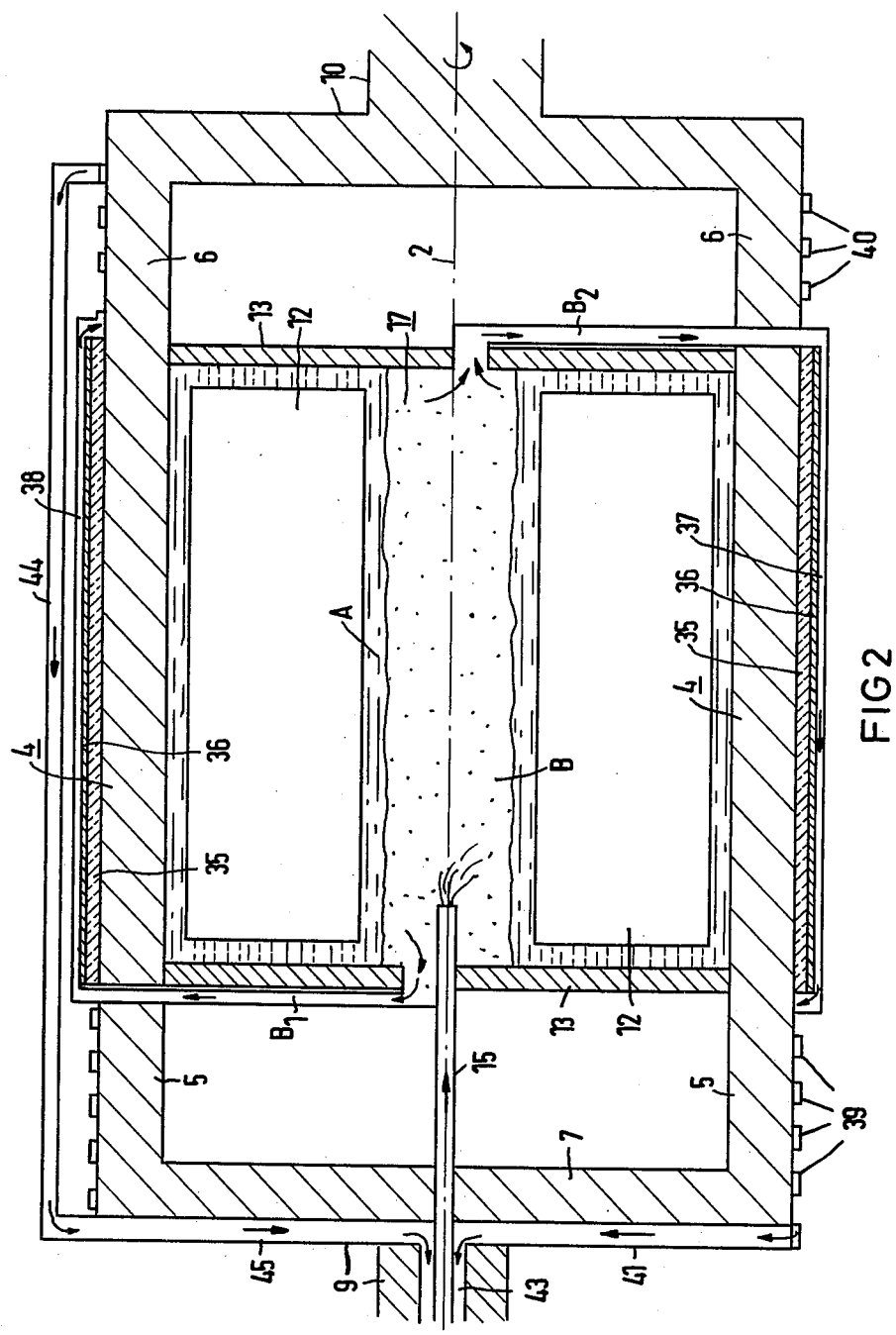

DEVICE FOR COOLING A SUPERCONDUCTING FIELD WINDING AND A DAMPER SHIELD OF THE ROTOR OF AN ELECTRIC MACHINE

BACKGROUND OF THE INVENTION

This invention relates to electric machines in general and more particularly to a device for cooling a superconducting field winding in the rotor of an electric machine, especially a turbo-generator.

A device for cooling a superconducting field winding in the rotor of an electric machine which includes at least one coolant space containing, in the operating condition, a vaporous and a liquid phase of cryogenic coolant fed in from outside the rotor, and which has coolant paths going through the field winding which are connected to the liquid space of the coolant space occupied by the liquid phase is known. At least one coolant exhaust gas line leads to outside the rotor and is connected to the vapor space of the coolant space occupied by the gaseous phase. The exhaust gas line is connected thermally to an end piece at the end face of a torque transmitting hollow cylindrical rotor body part. At least one coolant line extends along a damper shield which surrounds the field winding and is to be deep cooled, in the region of the superconducting field winding at the torque-transmitting rotor body part and is thermally insulated from the field winding by a hollow cylindrical body of solid insulating material. Such a cooling device is described in the report of the Electric Power Research Institute, U.S.A.; "EPRI EL-577, Project 429-1, Final Report", November 1977, pages 3-258 to 3-270.

The superconducting field winding of a generator must be kept at a sufficiently low temperature during the operation of the machine that its superconductors cannot make a transition into the normally conducting state. Generally, therefore, cooling of the winding with liquid helium used as the cryogenic coolant is provided, where the dissipation heat produced in the superconductors and the heat introduced from the outside via the end pieces at the end face of the torque transmitting parts of the rotor body lead to partial evaporation of coolant. The heat flow introduced into the low temperature region of the machine can be reduced considerably however by using the principle of counter flow cooling, if the evaporated, but still cold, coolant exhaust gas is conducted in good thermal contact along the torque transmitting end pieces of these rotor body parts, absorbing there a large part of the inflowing heat. The coolant exhaust gas is warmed up in the process and leaves the rotor at a connecting head as warm gas.

In the superconducting field winding itself, dissipation heat is produced among other things if the superconductors are subjected to a magnetic aternating field. This takes place in the rotor of a generator, for instance, if not all current phases of the stator winding are loaded uniformly and further, after progressive short-circuit switching or in the case of oscillations when the rotor speed temporarily does not agree completely with the predetermined network frequency. In order to keep the alternating field amplitudes at the superconductors small under such transient operating conditions, the superconducting field winding can be surrounded by one or more damper shields which shield the magnetic field and at the same time damp oscillations. For shielding low frequency fields, damper shields of thermally and electrically highly conductive material, held at a low temperature, are advantageous. For, practically no dissipation heat is produced in a damper shield in steady-state generator operation. Only during the relatively short transient operating cases, especially in the case of oscillations, is a very large amount of dissipation heat temporarily released. Contrary to the superconductors of the field winding, the temperature of which must remain below the transition temperature of its superconductive material even during transient operating conditions, the temperature of the cold damper may rise more, for instance, to 20 to 30 K.

In the turbo-generator known from the cited EPRI report with a cooling device of the type detailed above, a superconducting field winding surrounded by such a cold damper shield is provided. This generator contains a central coolant space which is subdivided into a liquid space away from the axis and a vapor space near the axis by a liquid and gaseous phase of the coolant helium. Liquid helium is fed into it from the outside. In cooling the field winding with liquid helium taken from the liquid space, a so-called self-pumping effect is utilized such as is described, for instance, in the dissertation by A. Bejan: "Improved Thermal Design of the Cryogenic Cooling System for a Superconducting Synchronous Generator", PhD. Thesis, Massachusetts Institute of Technology, U.S.A., Dec. 1974, pgs. 148 to 159. The damper shield of the machine known from the EPRI report is fastened to the outside of a torque transmitting support cylinder of the rotor body, in which individual canals are provided which serve as damper cooling canals. For this indirect cooling of the damper shield, liquid helium which is derived from the coolant paths leading to the superconducting field winding is used. The flow in the damper cooling canal is brought about by a so-called thermo-siphon effect: for heat generated in the cold damper shield travels through the support cylinder, gets into the helium contained in its cooling canal and excites convection there. Due to this convection, the warmed helium flows back into the helium bath provided at the center of the rotor, where a corresponding amount of liquid helium evaporates. While the liquid phase of this helium bath is separated from the liquid space of the central coolant space, the evaporation space of this bath forms part of the vapor space of the central coolant space. From this vapor space, evaporated helium is discharged from the rotor via exhaust gas lines, which are in thermal connection with the end pieces of the torque transmitting rotor body parts at the end faces. In the process, the coolant exhaust gas is brought approximately to room temperature and the torque transmitting end pieces are cooled down in accordance with the counterflow principle.

While it is ensured in this known cooling device that the heat from the cold damper shield does not get directly into the region of the superconducting field winding because the damper cooling canals are thermally insulated from the winding cooling canals by a solid hollow cylindrical insulating body, relatively large amounts of coolant exhaust gas appear in a very short time in this cooling device, in the case of transient operation, due to a temperature rise of the damper shield connected therewith because of the good heat transfer from the support cylinder into the helium contained in its cooling canal. This gas first gets into the vapor space of the central coolant space. A fast discharge of these amounts of exhaust gas through the exhaust gas lines connected to the torque transmitting end pieces of the rotor body part is difficult, however, since these lines have a relatively small flow cross section. The pressure in the central coolant space then rises accordingly. As a consequence, the saturation temperature of the helium used for cooling the superconducting field winding in the liquid space also increases and thereby, the temperature of the winding itself. This cooling device, in which a relatively large amount of liquid coolant is used up for an effective cooling of the damper shield can therefore be used only for generators of low power rating.

Another turbo-generator with a superconducting field winding and two damper shields to be cooled to a low temperature is described in the report by M. T. Bown et al entitled "Rotor Cooling System for 10-MVA Superconducting Generator" from: Proceedings of the 1979 Cryogenic Engineering Conference, Madison, Wisconsin, U.S.A. Aug. 21, to 24, 1979, paper IC 9. In the cooling device of this machine, the cooling of the damper shields and the cooling of the winding are largely separated form each other. Accordingly a separate coolant supply chamber is provided, in addition to the central coolant space for receiving the coolant required for cooling the superconducting field winding. The liquid helium required for cooling the damper shields is stored in this separate coolant supply chamber. In addition, a phase separator for separating gaseous helium components is provided in the coolant loop for cooling the damper shields. If heat is now suddenly liberated in the damper shields, a coolant circulation develops due to a thermo siphon effect from the helium bath contained in the coolant supply chamber through the first damper shield to the phase separator and subsequently through the second damper shield back to the helium bath. Through the heat input, helium vapor is generated in the helium bath of the coolant supply chamber and in the phase separator. The helium vapor can escape through special gas outlet openings and furthermore, through an emergency exit provided in the separator. A return valve in the connection between the coolant supply chamber and the coolant space containing the cooling bath for the winding prevents a pressure rise in the coolant supply chamber from reacting on the coolant bath of the winding. This valve further makes replenishing the coolant supply chamber with liquid helium possible. Exhaust gas from the coolant supply chamber and the phase separator is used for cooling the end pieces of the torque trasmitting rotor body parts of this machine. In this cooling device, the design of which is rather complicated, the difficulty exists, however, that the helium vapor which is formed in the coolant bath of the winding cannot escape as long as the return valve of the coolant supply chamber is shut. However, the pressure and thereby, the temperature of the coolant provided for cooling the field winding can then increase. In addition, a relatively large amount of liquid helium is required for effective cooling of the damper shields.

It is therefore an object of the present invention to simplify a cooling device of the type mentioned at the outset and to lower its coolant consumption. It should nevertheless be possible to discharge the coolant vapor occuring due to losses in the damper shield from the rotor without substantial warming of the liquid coolant that must be provided for cooling the field winding.

SUMMARY OF THE INVENTION

According to the present invention, this problem is solved by making the coolant line of the damper shield a section of the coolant exhaust line and arranging this section of the coolant exhaust line, as seen in the flow direction of the coolant exhaust gas, ahead of the line section of the coolant exhaust line which is thermally connected to the end piece of the torque transmitting rotor body part at the end face.

The advantages of this design of a cooling device are in particular, that, with the cooling of the field winding, the cooling of the damper shield as well as the cooling of the torque transmitting end piece of the rotor body part connected in series, reliable cooling is ensured even in the case of non-steady-state operation, and relatively little liquid helium is required. In addition, the cooling device with this series connection of the individual cooling functions is relatively simple since only a single coolant feed line and coolant discharge line is required at the coolant connecting head of the rotor.

According to a further embodiment of the cooling device according to the present invention, the damper shield can advantageously be arranged on the outside of the torque transmitting rotor body and the hollow cylindrical body of insulating material can be located between the damper shield and the torque transmitting rotor body part of the hollow cylindrical bodies of solid insulating material. In this design, the continuous stress of the insulating body by the nominal torque is eliminated. In addition, the installation of the cooling system for cooling the damper shield is particularly simple.

BRIEF DESCRIPTION OF THE DRAWINGS

FIG. 1 is a schematic cross section of a rotor with a cooling device according to the present invention.

FIG. 2 is a similar view of a further embodiment of such a cooling system.

DETAILED DESCRIPTION OF THE INVENTION

In FIG. 1, the flow of a coolant through the rotor of an electric machine, especially a turbo generator, is indicated in a longitudinal section. The rotor parts not shown in detail in the figure may correspond, for instance, to parts of a machine which is known from DE-OS No. 24 39 719. The rotor contains a rotor body 3, which is supported rotatably about an axis 2, with a hollow cylindrical torque transmitting rotor body part 4. The end pieces 5 and 6 at the end faces of this rotor body part 4 are connected to disc-shaped end walls 7 and 8. The end wall 7 extending in the radial direction is located on the connecting head side of the machine designated with 9, while the other end wall 8 is arranged on the turbine side 10 of the machine. The conductors of a superconducting field winding 12, not detailed in the figure, are accommodated in a winding support 13, for instance, in slots. Support 13 is arranged inside the torque transmitting rotor body part 4. The windings contain superconductive material. Liquid helium is used as the cryogenic coolant. For cooling the superconducting field winding 12, a cooling loop is advantageously provided, in which the well-known self-pumping effect if utilized.

The required helium is taken at subcritical pressure, i.e., for instance, in the normal boiling state at normal pressure or a slight over-pressure of, for instance, $1.1 \times 10^5$ Pa. and a temperature of about 4.4 K., from a coolant supply device, not shown, and is introduced into the rotor via a helium coupler at a connecting head, not shown in detail. By means of such a helium coupler, which is known, for instance, from the publication "Siemens Forschungs- and Entwicklungsberichte", vol. 5 (1976) no. 1, page 13, the coolant is transferred from stationary to rotating machine parts. The coolant is transported in this manner into a co-rotating, tubular feed line 15 which extends through the center of the rotor body in the axial direction and leads into a centrally arranged coolant space 17.

Due to heat inflow from the outside and also to dissipation losses arising in the winding parts of the field winding 12, parts of the helium provided for cooling the field winding evaporate. These parts accummulate in a region 18 of the coolant space 17 which is near the axis and is designated as the vapor space. In the operating condition, a two-phase mixture of liquid coolant A and gaseous coolant B is contained in the coolant space 17. Upon rotation, a phase separation occurs under the influence of centrifugal forces, so that then the heavier liquid coolant A accummulates in the liquid space 19 concentrically around the gaseous coolant B which is held in the vapor space 18 facing the rotor axis 2.

For limiting the alternating field amplitudes at the superconducting conductors of the field winding 12, for instance, in the event of a shock short circuit or oscillations, the field winding 12 is surrounded concentrically by a co-rotating damper shield 21. This damper shield is arranged on the inside of the torque transmitting hollow cylindrical rotor body part 4 and is cooled down to the low temperature. Practically no dissipation heat is produced in this shield, which advantageously consists of a material with very good thermal and electric conductivity such as cooper, while the generator is in steady-state operation. Only during the relatively brief transient operation, is a very large amount of dissipation heat temporarily liberated.

In order to prevent heat from being conducted directly from the damper shield 21 into the liquid helium A cooling the superconducting field winding 12, a hollow cylindrical insulating body 22 is arranged between the damper shield and the field winding with its cooling canals.

The cooling systems required for cooling the damper shield 21 contains at least one pair of damper cooling canals 24 and 25 which are at least approximately parallel to the axis and are connected via at least one radial tubular connecting line, 26 and 27, respectively, to the vapor space 18 of the coolant space 17. The connecting line 26 is located on the end face of the winding support 13 which is facing the connecting head side 9 of the rotor, while the connecting line 27 is arranged at the opposite end face of the winding support which is facing the turbine side 10.

Coolant exhaust gas which is fed from the vapor space 18 via the connecting line 26 into the coolant canal 24 of the damper shield 21 and is designated as $B_1$, is advantageously utilized, after flowing through the damper coolant canal 24, for counterflow cooling of the end piece of the hollow cylindrical torque transmitting rotor body part 4 located on the turbine side 10. To this end, it flows through a spiral shaped line 28 on the inside of this end piece 6 and then opens via a radial connecting line 29 into a return line 30 near the axis, which is formed by a double tube concentrically arranged about the axis 2 and leads to the connecting head of the rotor. In a similar manner, coolant exhaust gas $B_2$ which is fed via the radial connecting line 27 into the damper cooling canal 25, is fed into the return line 30 through a spiral shaped line 32 which is thermally connected to the torque transmitting end piece 5 of the hollow cylindrical rotor body part 4 as well as via a radial connecting line 33. In the spiral shaped lines 28 and 32, the major part of the heat which flows via the torque transmitting end pieces 6 and 5 from the warm region of the rotor into its cold region is absorbed. The flow of the coolant exhaust gas $B_1$ and $B_2$, which is indicated in the figure by arrows, is in opposite directions in the damper cooling canals 24 and 25, i.e., from the exciter to the turbine side and vice versa.

This series circuit of the cooling of the field winding 12, the cooling of the damper shield 21 and the cooling of the torque transmitting end pieces 5 and 6 of the rotor body part 4 is also of advantage for non-stationary operation. The superconducting winding is surrounded by liquid helium A and is therefore particularly well cooled. In steady state operation, only a small amount of heat gets into the region of the winding from the outside, and particularly no heat is generated in the damper shield 21. The small amount of evaporated helium is sufficient to keep the damper shield at the low temperature and to cool the torque transmitting end pieces 5 and 6. The helium gas flow is small because the region of the superconducting winding 12 is practically surrounded on all sides by surfaces which are cooled by cold helium gas. The helium is therefore utilized very economically.

In transient operation, a relatively small amount of heat is liberated in the superconducting winding and a relatively large amount of heat in the cold damper shield. The cooling of the winding is very effective so that an increased gas flow is generated rapidly. However, the amount of heat liberated in the damper shield is so large that only a small part thereof can be removed immediately even by the increased gas flow. The rest heats up the damper shield 21 and penetrates in part also into the insulating body 22. In the further course of operation, the production of heat in the superconductors of the winding and in the damper shield then ceases. However, the damper shield and the insulating body 22 are still at elevated temperature. They therefore form a kind of intermediate storage for the liberated heat. In the meantime part of the heat has also arrived through the insulating body at the liquid helium A of the field winding 12, so that the increased helium gas flow continues to be produced until the insulating body and the damper shield 21 have been cooled down again to the lower temperature of the steady-state operating condition.

It is achieved in this manner that, while an increased gas flow takes place during transient operation, it is substantially smaller than in the EPRI cooling device described at the outset, so that the pressure increase in the central coolant space 17 remains substantially smaller. In addition, substantially less liquid helium is required overall, because not only the evaporation enthalpy of the liquid helium of about 20 kilojoule/kg, but additionally also the enthalpy of the helium gas is utilized. Depending on the temperature of the damper shield, approximately 35 kilojoule/kg are additionally gained at 10 K., approximately 88 kilojoule/kg at 20 K., and approximately 140 kilojoule/kg at 30 K.

In the rotor body according to FIG. 1, the torque is transmitted via the cold damper shield 21 and the insulating body 22 into the region of the winding. The material of the insulating body is heavily stressed mechanically. Optionally, it may be reinforced by special material such as glass fibers. If, however, heavy stress of this insulating material is to be avoided in a machine, an arrangement of the insulating body and the damper shield according to the embodiment of FIG. 2 can be provided. In this figure, parts identical with FIG. 1 are provided with the same reference symbols.

Deviating from the embodiment according to FIG. 1, the damper shield and the insulating body are arranged in the rotor according to FIG. 2 not on the inside of the hollow cylindrical torque transmitting rotor body part 4 but are located outside of this rotor body part. Accordingly, there is arranged on the outside of this rotor body part 4 an insulating body 35 which is enclosed by a damper shield 36 to be cooled. The cooling canals for this damper shield, designated as 37 and 38, are likewise located outside the torque transmitting rotor body part 4. They open into spiral shaped cooling lines 39 and 40 which are arranged outside of the end pieces 5 and 6 on the end face of this rotor body part. For taking out the coolant exhaust gas $B_2$, warmed up in the cooling line 39, near the axis, a radial connecting line 41 is provided which is arranged outside of the end wall 7 and is connected to an exhaust gas line 43 with an annular cross section near the axis. In a similar manner the exhaust gas $B_1$ which is warmed up in the cooling line 40 is fed first via a connecting line 44 which is parallel to the axis and arranged outside of the torque transmitting rotor body part 4, and then via a further radial connecting line 45 at the end wall 7 into the exhaust gas line 43 near the axis.

In the embodiment of the rotor body shown in FIG. 2, the hollow cylindrical torque transmitting rotor body part 4 takes over in part the intermediate storage function of the insulating body 22 according to FIG. 1. The insulating body 35 can therefore be made correspondingly thinner than the insulating body 22 according to FIG. 1.

The cooling device as shown in FIGS. 1 and 2 can furthermore be combined easily with an arrangement for cooling a deep cooled field winding in the rotor of an electric machine such as is described in U.S. Ser. No. 148,829. In this known cooling arrangement, an underpressure is generated and maintained stably in the helium in the vicinity of the winding if the helium evaporated in the center is brought to the periphery and a cold line section there has good thermal contact with the liquid helium. In the cooling device shown in FIGS. 1 and 2, the total length of the damper cooling canals 22, 23 and 37, 38 corresponds to the cold line section according to the cooling arrangement known from this application. The heat-exchanging area is relatively very large here, so that good thermal contact between the cold line section and the liquid helium is realized even if an insulating body is arranged between the damper cooling canals and the liquid helium.

According to the embodiment of rotor bodies with a cooling device according to the present invention shown in FIGS. 1 and 2, it was assumed that the damper shields are connected to respective pairs of cooling canals in good thermal contact, in which there is a counterflow of cold exhaust gas. This is advantageous if the medium cooling the torque transmitting end pieces of the rotor body is first to be utilized for cooling the damper shield. However, it is also possible to cool one of the two torque transmitting end pieces directly with the coolant taken from the helium vapor space and to remove the coolant warmed up there from the rotor body, while only the other end piece of the torque transmitting rotor body part on the end face is counter flow cooled by the damper shield coolant.

Furthermore, it is also possible in the cooling device according to the present invention to feed the cold exhaust gas taken from the vapor space of the coolant space for cooling the damper shield into cooling canals which are thermally connected to the damper shield, at the center between the two end faces of the rotor body. The coolant exhaust gas can then be conducted symmetrically to the center plane through cooling canals and the cooling lines which are connected thereto and are thermally connected to the torque transmitting end pieces.

What is claimed is:

1. In a device for cooling a superconducting field winding in the rotor of an electric machine, especially a turbo-generator, said device including at least one coolant space which contains, in the operating condition, a vaporous and a liquid phase of a cryogenic coolant which is fed in from outside the rotor; coolant paths going through the field winding which are connected to the liquid space of the coolant space occupied by the liquid phase; at least one coolant exhaust line which leads to outside the rotor and is connected to the vapor space of the coolant space occupied by the gaseous phase, said exhaust line connected thermally to an end piece at the end face of a torque transmitting hollow-cylindrical rotor body part; and at least one coolant line extending along a damper shield which surrounds the field winding and is to be deep-cooled, and arranged in the region of the superconducting field winding at the torque-transmitting rotor body part, said damper shield thermally insulated from the field winding by a hollow cylindrical body of solid insulating material, the improvement comprising the coolant line of the damper shield being a section of the coolant exhaust gas line, said section of the coolant exhaust gas line arranged, as seen in the flow direction of the coolant exhaust gas, ahead of the line section of the coolant exhaust line which is thermally connected to the end piece of the torque-transmitting rotor body part at the end face.

2. The improvement according to claim 1 wherein said damper shield is on the inside of the torque transmitting rotor body part and wherein said hollow cylindrical body of solid insulating material arranged is between the damper shield and the field winding.

3. The improvement according to claim 1 wherein said damper shield is on the outside of the torque transmitting rotor body part and wherein said hollow cylindrical body of solid insulating material is arranged between the damper shield and the torque-transmitting rotor body part.

4. The improvement according to one of claims 1-3 wherein said rotor has two end pieces of a torque transmitting rotor part at the end faces, each of which is provided with at least one coolant line, comprising at least one pair of coolant lines at the damper shield extending parallel to the axis with an antiparallel flow of the coolant exhaust gas in the coolant lines of each pair.

5. The improvement according to one of claims 1-3 wherein said rotor has two end pieces at the end faces of a torque transmitting rotor part, each of which is provided with at least one coolant line, comprising means feeding coolant exhaust gas taken from the vapor space of the coolant space into coolant lines thermally connected to the damper shield approximately in the axial center of the rotor body, the flow of the coolant exhaust gas in these coolant lines being from the center of the rotor toward the connected coolant lines of the torque transmitting end pieces at the end faces.

* * * * *